United States Patent

Sohl-Dickstein et al.

(10) Patent No.: US 12,260,311 B2
(45) Date of Patent: Mar. 25, 2025

(54) NEURAL NETWORKS WITH PRE-NORMALIZED LAYERS OR REGULARIZATION NORMALIZATION LAYERS

(71) Applicant: Google LLC, Mountain View, CA (US)

(72) Inventors: Jascha Narain Sohl-Dickstein, San Francisco, CA (US); Vinay Srinivas Rao, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 843 days.

(21) Appl. No.: 17/493,790

(22) Filed: Oct. 4, 2021

(65) Prior Publication Data

US 2022/0108149 A1    Apr. 7, 2022

Related U.S. Application Data

(60) Provisional application No. 63/087,112, filed on Oct. 2, 2020.

(51) Int. Cl.
*G06N 3/04* (2023.01)
*G06N 3/08* (2023.01)

(52) U.S. Cl.
CPC ............... *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 9,554,086 B1* | 1/2017 | Sheng | G06T 7/246 |
| 11,526,756 B1* | 12/2022 | Arici | G06N 3/045 |
| 11,563,980 B2* | 1/2023 | Chang | H04N 19/70 |
| 2018/0121796 A1* | 5/2018 | Deisher | G10L 15/16 |
| 2018/0121802 A1* | 5/2018 | Ruckauer | G06N 3/049 |
| 2019/0042935 A1* | 2/2019 | Deisher | G06N 3/044 |
| 2020/0177365 A1* | 6/2020 | De Hoogh | G06F 17/141 |
| 2020/0294493 A1* | 9/2020 | Terpilowski | H03M 7/28 |
| 2021/0174211 A1* | 6/2021 | MacDdonald | G06N 3/084 |
| 2022/0058211 A1* | 2/2022 | Wismüller | G06F 16/2264 |
| 2022/0108149 A1* | 4/2022 | Sohl-Dickstein | G06N 3/04 |
| 2022/0358904 A1* | 11/2022 | Mandel | G10L 13/047 |
| 2023/0107247 A1* | 4/2023 | Martens | G06N 3/084 706/25 |
| 2023/0252946 A1* | 8/2023 | Chang | G09G 3/3291 345/204 |
| 2023/0395094 A1* | 12/2023 | Ding | G10L 25/45 |
| 2024/0370696 A2* | 11/2024 | Massingham | G06N 3/0464 |

OTHER PUBLICATIONS

Arpit et al., "Normalization propagation: A parametric technique for removing internal covariate shift in deep networks," ArXiv, Jul. 12, 2016, 11 pages.

Ba et al., "Layer normalization," ArXiv, Jul. 21, 2016, 14 pages.

(Continued)

*Primary Examiner* — David E Choi

(74) *Attorney, Agent, or Firm* — Fish & Richardson P.C.

(57) ABSTRACT

Methods, systems, and apparatus, including computer programs encoded on computer storage media, for processing inputs using a neural network system that includes one or more pre-normalized layers or one or more regularization normalization layers.

21 Claims, 4 Drawing Sheets

(56) References Cited

OTHER PUBLICATIONS

Balduzzi et al., "The shattered gradients problem: If resnets are the answer, then what is the question?" ArXiv, Jun. 6, 2018, 14 pages.
Bjorck et al., "Understanding batch normalization," Presented at 32nd Conference on Neural Information Processing Systems (NeurIPS 2018), Montréal, Canada, Dec. 2-8, 2018, 12 pages.
Frankle et al., "The early phase of neural network training," ArXiv, Feb. 24, 2020, 20 pages.
Ghorbani et al., "An investigation into neural net optimization via hessian eigenvalue density," Presented at 36th International Conference on Machine Learning (ICML), Long Beach, CA, USA, Jun. 9-15, 2019, 10 pages.
He et al., "Deep residual learning for image recognition," Presented at 2016 IEEE Conference on Computer Vision and Pattern Recognition (CVPR), Las Vegas, NV, USA, Jun. 27-30, 2016, pp. 770-778.
Ho et al., "Axial attention in multidimensional transformers," ArXiv, Dec. 20, 2019, 11 pages.
Ioffe et al., "Batch normalization: Accelerating deep network training by reducing internal covariate shift," ArXiv, Mar. 2, 2015, 11 pages.
Ioffe, "Batch renormalization: Towards reducing minibatch dependence in batch-normalized models," ArXiv, Mar. 30, 2017, 6 pages.
Jastrzebski et al., "The break-even point on optimization trajectories of deep neural networks," ArXiv, Feb. 21, 2020, 21 pages.
Kessy et al., "Optimal whitening and decorrelation," The American Statistician, Jan. 26, 2018, 72:309-314.
Kohler et al., "Towards a theoretical understanding of batch normalization," ArXiv, May 27, 2018, 33 pages.
Krizhevsky, "Learning multiple layers of features from tiny images," Computer Science, Apr. 8, 2009, 60 pages.
Laurent et al., "Recurrent normalization propagation," ICLR, Feb. 15, 2017, 9 pages.
LeCun et al., "Automatic learning rate maximization by on-line estimation of the hessian's eigenvectors," Advances in Neural Information Processing Systems 5 (NIPS 1992), Jan. 1993, pp. 156-163.
Lewkowycz et al., "The large learning rate phase of deep learning: the catapult mechanism," arXiv, Mar. 4, 2020, 25 pages.
Luo et al., "Towards understanding regularization in batch normalization," ArXiv, Apr. 24, 2019, 23 pages.
Poole et al., "Exponential expressivity in deep neural networks through transient chaos," Presented at 30th Conference on Neural Information Processing Systems (NIPS 2016), Barcelona, Spain, Dec. 5-10, 2016, 9 pages.
Salimans et al., "Weight normalization: A simple reparameterization to accelerate training of deep neural networks," ArXiv, Jun. 4, 2016, 11 pages.
Sankararaman et al., "The impact of neural network overparameterization on gradient confusion and stochastic gradient descent," ArXiv, Oct. 16, 2019, 41 pages.
Santurkar et al., "How does batch normalization help optimization?," Presented at 32nd Conference on Neural Information Processing Systems (NeurIPS 2018), Montreal, Canada, Dec. 2-8, 2018, 11 pages.
Schoenholz et al., "Deep information propagation," arXiv, Nov. 4, 2016, 17 pages.
Shen et al., "Rethinking batch normalization in transformers," arXiv, Mar. 17, 2020, 19 pages.
Singh et al., "Filter response normalization layer: Eliminating batch dependence in the training of deep neural networks," ArXiv, Nov. 21, 2019, 10 pages.
Ulyanov et al., "Instance normalization: The missing ingredient for fast stylization," ArXiv, Sep. 20, 2016, 6 pages.
Vaswani et al., "Attention is all you need," ArXiv, Dec. 6, 2017, 15 pages.
Wu et al., "Group normalization," Proceedings of the European Conference on Computer Vision (ECCV), Sep. 2018, 17 pages.
Xiao et al., "Disentangling trainability and generalization in deep learning," ArXiv, Dec. 30, 2019, 22 pages.
Xiao et al., "Dynamical isometry and a mean field theory of CNNs: How to train 10,000-layer vanilla convolutional neural networks," ArXiv, Jul. 10, 2018, 16 pages.
Xiong et al., "On layer normalization in the transformer architecture," ArXiv, Jun. 29, 2020, 17 pages.
Yang et al., "A mean field theory of batch normalization," ArXiv, Mar. 5, 2019, 95 pages.
Zagoruyko et al., "Wide residual networks," ArXiv, Nov. 28, 2016, 15 pages.

* cited by examiner

NEURAL NETWORKS WITH PRE-NORMALIZED LAYERS OR REGULARIZATION NORMALIZATION LAYERS

CROSS-REFERENCE TO RELATED APPLICATION

This application claims priority to U.S. Provisional Application No. 63/087,112, filed on Oct. 2, 2020. The disclosure of the prior application is considered part of and is incorporated by reference in the disclosure of this application.

BACKGROUND

This specification relates to processing inputs through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that uses a neural network to process network inputs to generate network outputs. More specifically, to improve the performance of the neural network, the neural network includes either one or more pre-normalized layers or one or more regularization normalization layers.

Particular embodiments of the subject matter described in this specification can be implemented so as to realize one or more of the following advantages.

Batch normalization has been shown to be an effective normalizer for training a variety of neural networks. That is, a variety of neural networks have shown improved performance on a variety of tasks after one or more layers are replaced with batch normalized layers. However, batch normalization requires computing normalization statistics across an entire batch of training inputs. This causes additional overhead and complexity while training to accumulate statistics for test-time, i.e., to accumulate statistics that can be used in place of batch statistics after training, to synchronize these statistics across accelerators while training, and to accumulate statistics over the batch dimension (involving non-local memory-access patterns).

Thus, batch normalization causes a significant increase in computational resource consumption during training, especially in the distributed training frameworks that are commonly used to train neural network for deployment for industrial tasks, i.e., frameworks that distribute training among multiple accelerators.

The described techniques, on the other hand, achieve performance that matches or even exceeds that of batch normalization without requiring operations over the batch dimension or differences between inference and training behavior as are required when using batch normalization. This greatly reduces the computational overhead of the training process.

Thus, neural networks that have some or all of the layers replaced with the regularization normalization layers or pre-normalized layers described in this specification exhibit improved performance, e.g., performance that is comparable to or better than performance that would be achieved through batch normalization, while consuming many fewer computational resources than a batch normalized neural network would during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
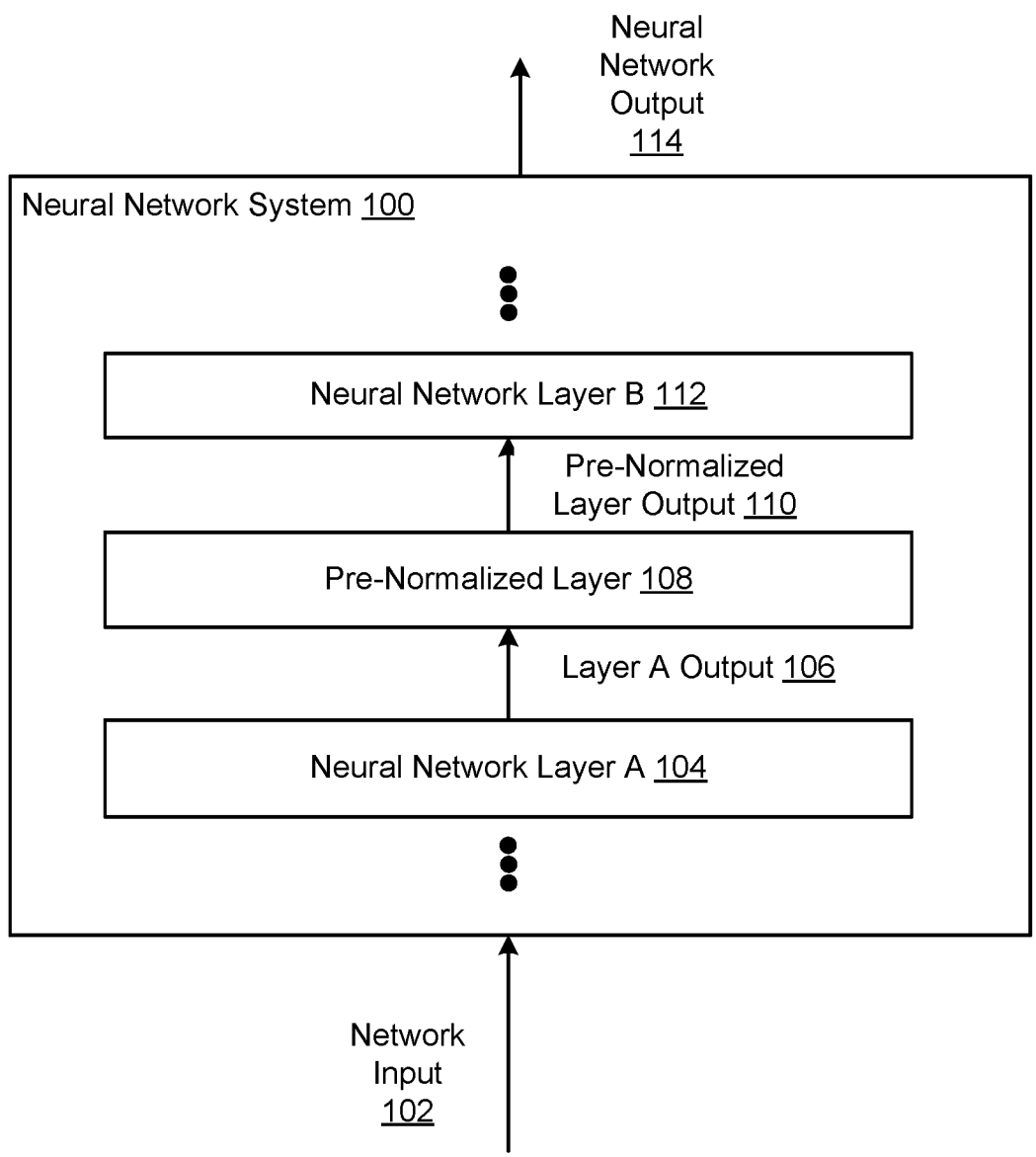
FIG. 1 shows an example neural network system.

This specification describes systems implemented as computer programs on one or more computers in one or more locations that process inputs using a neural network that includes either a pre-normalized layer or a regularization normalization layer.

A pre-normalized layer performs normalization during the processing of an input to the layer by "shifting" the elements of the input before applying an affine operation to the shifted elements and then "scaling" the elements of the transformed layer input that is the output of the affine operation. This is in contrast to applying both "shifting" and "scaling" before the affine operation or applying both "shifting" and "scaling" after the affine operation. Moreover, the statistics used to "shift" and "scale" are computed over the values in a single layer input. This is in contrast to computing these statistics across multiple training examples, i.e., across all of the examples in a batch of training examples during training.

A regularization normalization layer performs normalization by explicitly "scaling" the elements of the output of the affine operation while regularizing the weights of the affine operation during training to cause the output of the affine operation to be implicitly "scaled." The statistics used to "scale" are computed over the elements in the output of the affine operation in a single layer input.

The neural network can be trained to perform any kind of machine learning task, i.e., can be configured to receive any kind of digital data input and to generate any kind of score, classification, or regression output based on the input.

In some cases, the neural network is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

In particular, the neural network described in this specification can have any appropriate architecture, but with one or more of the layers in the architecture replaced with a regularization normalization or pre-normalized layer, i.e., as described in the description below. In other words, while the description below recites that one of the layers of the neural network is a pre-normalized or regularization normalization layer, in practice the neural network can have multiple such layers and, optionally, one or more conventional layers, e.g., output layers, convolutional layers, fully-connected layers, and so on.

FIG. 1 shows an example neural network system 100. The neural network system 100 is an example of a system implemented as computer programs on one or more computers in one or more locations, in which the systems, components, and techniques described below can be implemented.

The neural network system 100 processes network inputs 102 using a neural network that includes multiple neural network layers that are arranged in directed graph. The neural network is configured to generate neural network outputs 114 from neural network inputs by processing the neural network inputs through each of the layers in the neural network in an order that is defined by the directed graph, i.e., so that the output of each layer is provided to as input to any layers that are connected to the layer by an outgoing edge in the directed graph.

As described above, the neural network system 100 can be configured to perform any kind of machine learning task, i.e., to receive any kind of digital data input and to generate any kind of score output, classification output, or regression output based on the input.

Additionally, the neural network can have any appropriate architecture for performing the machine learning task. Examples include convolutional neural network architectures, feed-forward network architectures, e.g., multi-layer perceptrons, Transformer architectures that include multiple self-attention layers, and recurrent neural network architectures, e.g., GRUs or LSTMs.

In particular, each of the layers of the neural network is configured to receive an input and generate an output from the input and the neural network layers collectively process neural network inputs 102 received by the neural network to generate a respective neural network output 114 for each received neural network input 102.

Some or all of the neural network layers in the directed graph generate outputs from inputs in accordance with current values of a set of parameters for the neural network layer. For example, some layers may be fully-connected layers that multiply the received input by a matrix of current parameter values as part of generating an output from the received input. As another example, some layers may be convolutional layers that perform a convolution between a kernel of weights of the convolutional layer and the layer input to the layer.

Generally, the neural network includes at least one pre-normalized layer. In the example of FIG. 1, the neural network includes a pre-normalized layer 108 between a neural network layer A 104 and a neural network layer B 112 in the directed graph of neural network layers.

Layers 104 and 112 can be any of a variety of types of neural network layers, e.g., conventional layers like fully-connected layers, convolutional layers, recurrent layers, or attention layers, or other pre-normalized layers.

The pre-normalized layer 108 is configured to perform operations on inputs received from the neural network layer A 104, i.e., layer A outputs 106, to generate a pre-normalized layer output 110 and to provide the layer output 110 as input to the neural network layer B 112.

The operations performed by a pre-normalized layer 108 depend on whether the layer is a fully-connected layer or a convolutional layer, but, generally, the pre-normalized layer 108 performs normalization during the processing of an input by the layer. In particular the pre-normalized layer 108 performs the normalization by "shifting" the elements of the input before applying an affine operation to the shifted elements and then "scaling" the elements of the transformed layer input that is the output of the affine operation.

The operations performed by the pre-normalized layer 108 are described in more detail below with reference to FIG. 2.

The pre-normalized layer 108 may be included at various locations in the directed graph of neural network layers and, in some implementations, multiple pre-normalized layers may be included in the sequence. For example, while the pre-normalized layer 108 is shown as a "hidden" layer of the neural network that receives the output of layer 104, the neural network could also or instead include a pre-normalized layer as an input layer that directly processes the network input 102. As one example, an existing neural network architecture can be modified to replace each batch normalized layer with a pre-normalized layer. As another example, a layer normalization layer and a subsequent layer that applies an affine operation can be fused and replaced with a single pre-normalized layer.

Prior to using the neural network to process new inputs, the neural network system 100 trains the neural network to determine trained values of the parameters of the neural network, including the parameters of the pre-normalized layer 108.

In particular, the system 100 trains the neural network on training data that includes multiple batches of training examples. A batch of training examples is a set of multiple training examples that each include a training network input and a target output for the training input that represents an output that should be generated by the neural network by performing the neural network task that the neural network is configured for on the training network input.

For example, at each iteration during training, the neural network system 100 can process a batch of training examples and generate a respective neural network output for each training input in the batch. The neural network outputs can then be used to adjust the values of the parameters of the neural network layers, e.g., by computing, through conventional gradient descent and backpropagation neural network training techniques, gradients with respect to the parameters of a loss function for the neural network task, e.g., a cross-entropy loss, a negative log-likelihood loss, a mean squared error loss, and so on, that is based on the neural network outputs and the target outputs in the training example. Thus, the parameters of the pre-normalized layer 108 are learned through gradient descent and backpropagation during the training of the neural network.

Figure 2:
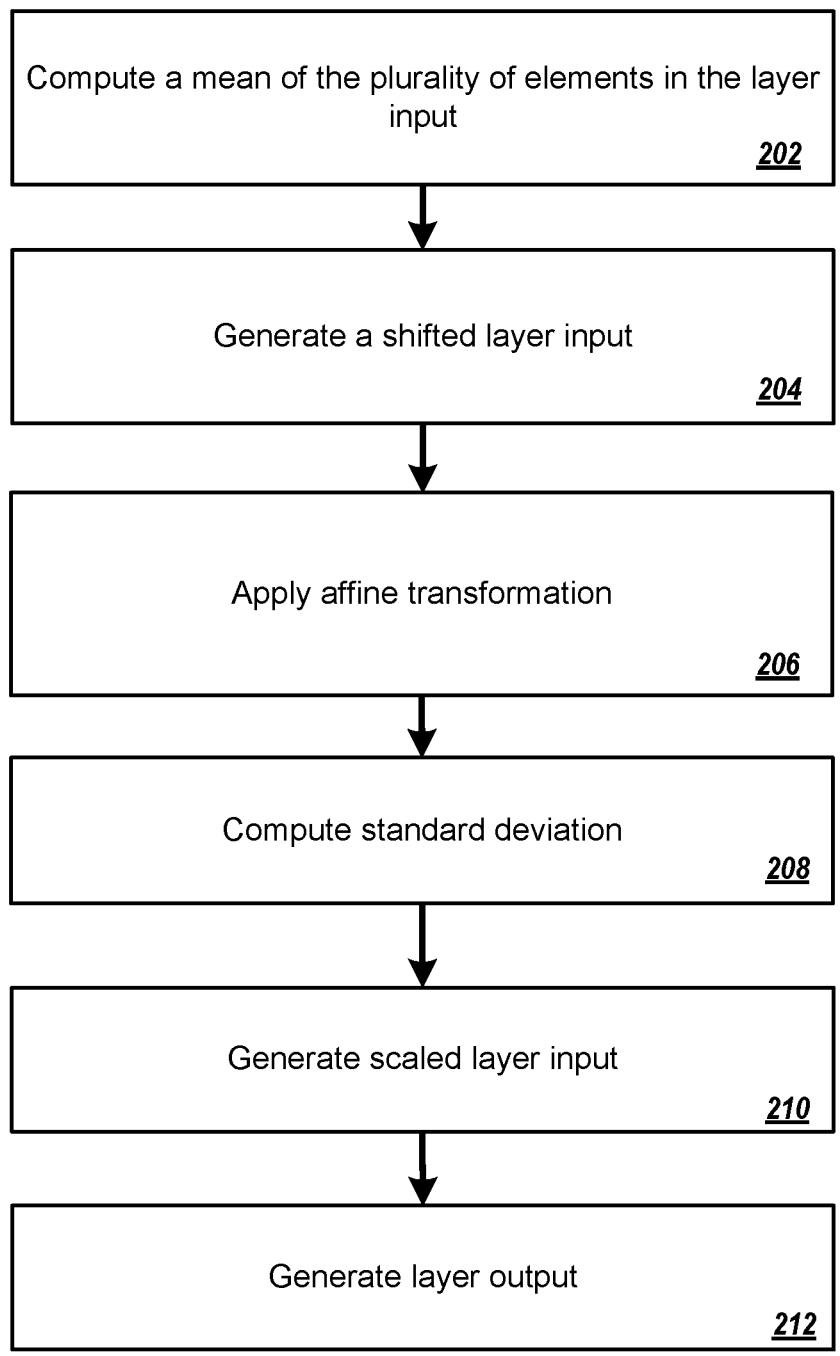
FIG. 2 is a flow diagram of an example process for processing an input using a pre-normalized layer.

FIG. 2 is a flow diagram of an example process 200 for processing an input using a pre-normalized layer. For convenience, the process 200 will be described as being performed by a system of one or more computers located in one or more locations. For example, a batch normalization layer included in a neural network system, e.g., the batch normalization layer 108 included in the neural network system 100 of FIG. 1, appropriately programmed, can perform the process 200.

The process 200 can be performed during inference, i.e., after the neural network has been trained, or during training, i.e., as part of the forward pass through the neural network to compute a network output for a training input and to later update the values of the parameters of the pre-normalized layer and the other layers in the neural network by computing a backward pass through the neural network. That is, unlike batch normalization layers, pre-normalized layers perform the same operations during both training and inference.

Generally, the pre-normalized layer is configured to receive a layer input that has a plurality of first elements. For example, the layer input can be a vector, a matrix, or a higher-order tensor, e.g., a feature map that has multiple channels.

If the pre-normalized layer is the initial layer in the directed graph, the layer input is the network input. If not, the layer input is an output generated by one or more other layers in the plurality of neural network layers, i.e., the output of the one or more other layers that are connected to the pre-normalized layer by an incoming edge in the directed graph.

The pre-normalized layer computes a mean of the plurality of first elements in the layer input (step 202). That is, unlike a batch normalization layer, the pre-normalization layer computes the mean of only the elements within the layer input and not across multiple different layers inputs in batch of inputs.

The pre-normalized layer generates a shifted layer input by subtracting, from each first element in the layer input, the mean of the plurality of first elements (step 204). That is, the system subtracts the same computed mean value from each of the plurality of first elements.

The pre-normalized layer applies an affine operation to the shifted layer input in accordance with a set of weights of the pre-normalized layer to generate a transformed layer input having a plurality of transformed elements (step 206).

In some implementations, the pre-normalized layer is a fully-connected layer and the affine operation is a multiplication between a matrix of the weights of the pre-normalized layer and the shifted layer input.

In some other implementations, the pre-normalized layer is a convolutional layer and the affine operation is a convolution between a kernel of the weights of the pre-normalized layer and the shifted layer input That is, unlike a layer normalization layer, the pre-normalized layer only "shifts" the layer inputs before applying the affine operation rather than both "shifting" and "scaling" the layer inputs before the layer inputs.

The pre-normalized layer computes a standard deviation of the transformed elements in the transformed layer input (step 208). In some implementations, the standard deviation is equal to the square root of the variance of the transformed elements. In some other implementations, the standard deviation is a numerically stable standard deviation that is equal to $(\sigma_B^2+\varepsilon)^{1/2}$, where $\varepsilon$ is a constant value and $\sigma_B^2$ is the variance of the transformed elements.

The pre-normalized layer generates a scaled layer input by dividing each transformed element by the standard deviation (step 210). Thus, unlike a layer normalization layer, the pre-normalized layer (i) "scales" the layer inputs after the affine operation is applied and (ii) uses the standard deviation of the transformed elements after the affine transformation (instead of the elements in the layer input) to perform the scaling.

The pre-normalized layer generates a layer output from the scaled layer input (step 312).

Once generated, the pre-normalized layer can provide the layer output as input to another one of the neural network layers in the neural network, i.e., to each layer that is connected by an outgoing edge from the pre-normalized layer in the directed graph.

In some cases, the scaled layer input is the layer output. In some other cases, the pre-normalized layer applies one or more additional operations to the scaled layer input to generate the layer output.

In particular, the pre-normalized layer can apply a scaling parameter to the scaled layer input to generate a second scaled layer input and apply a bias parameter to the second scaled layer input to generate a biased scaled layer input. The scaling parameter and the bias parameter are learned jointly with the set of weights of the pre-normalized layer, i.e., the set of weights that make up the matrix or kernel that is used to apply the affine operation, during training of the neural network.

Optionally, the pre-normalized layer can then apply a non-linear activation function, e.g., inverse tangent, sigmoid, or ReLU, to the biased scaled layer input to generate the layer output.

Figure 3:
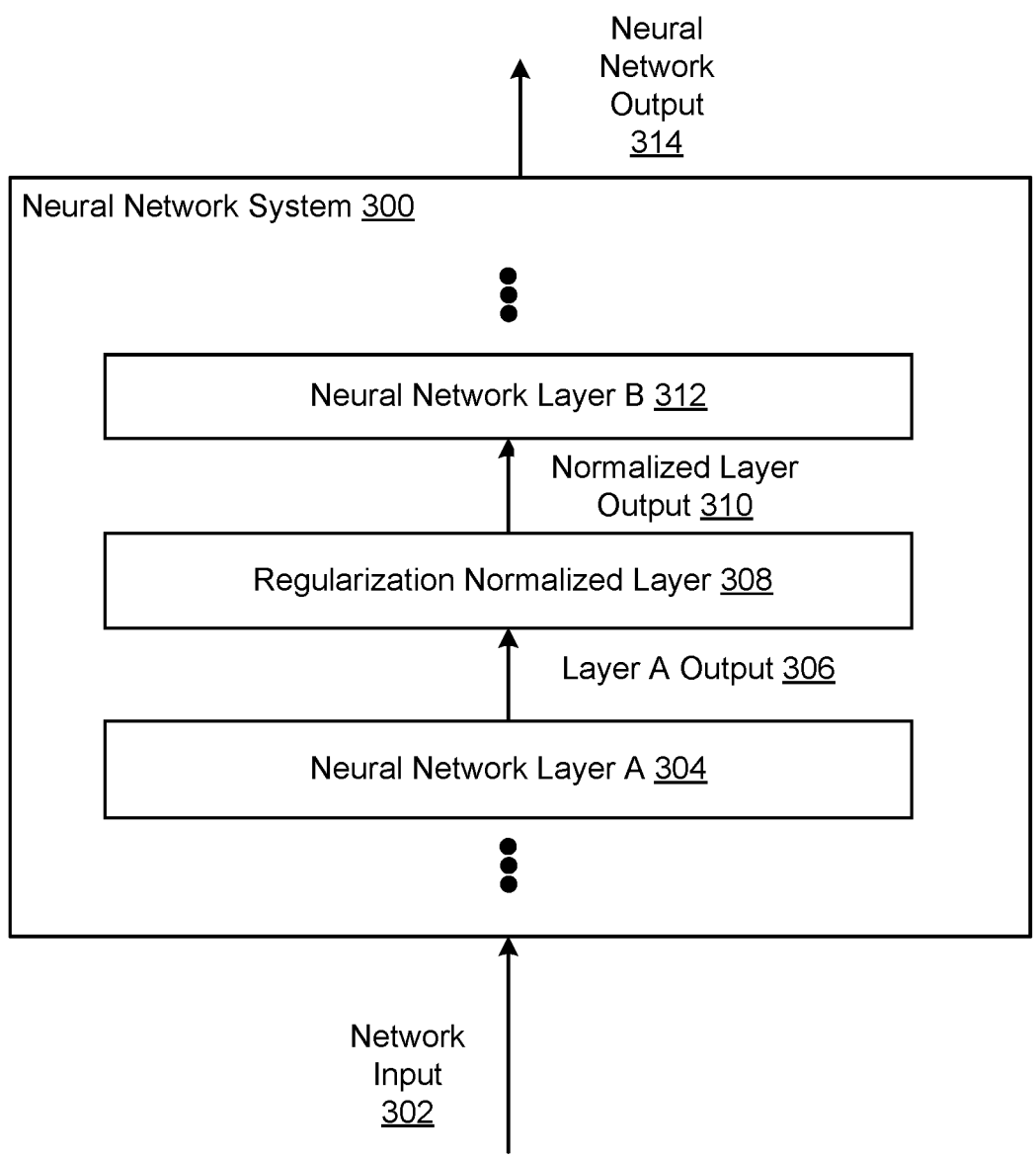
FIG. 3 shows another example neural network system.

FIG. 3 shows another example neural network system 300. The neural network system 300 is an example of a system implemented as computer programs on one or more computers in one or more locations, in which the systems, components, and techniques described below can be implemented.

The neural network system 300 processes network inputs 302 using a neural network that includes multiple neural network layers that are arranged in directed graph. The neural network is configured to generate neural network outputs 314 from neural network inputs by processing the neural network inputs through each of the layers in the neural network in an order that is defined by the directed graph, i.e., so that the output of each layer is provided to as input to any layers that are connected to the layer by an outgoing edge in the directed graph.

As described above, the neural network system 300 can be configured to perform any kind of machine learning task, i.e., to receive any kind of digital data input and to generate any kind of score output, classification output, or regression output based on the input.

Additionally, the neural network can have any appropriate architecture for performing the machine learning task. Examples include convolutional neural network architectures, feed-forward network architectures, e.g., multi-layer perceptrons, Transformer architectures that include multiple self-attention layers, and recurrent neural network architectures, e.g., GRUs or LSTMs.

In particular, each of the layers of the neural network is configured to receive an input and generate an output from the input and the neural network layers collectively process neural network inputs 302 received by the neural network to generate a respective neural network output 314 for each received neural network input 302.

Some or all of the neural network layers in the directed graph generate outputs from inputs in accordance with current values of a set of parameters for the neural network layer. For example, some layers may be fully-connected layers that multiply the received input by a matrix of current parameter values as part of generating an output from the received input. As another example, some layers may be convolutional layers that perform a convolution between a kernel of weights of the convolutional layer and the layer input to the layer.

Generally, the neural network includes at least one regularization normalization layer. In the example of FIG. 3, the neural network includes a regularization normalization layer 308 between a neural network layer A 304 and a neural network layer B 312 in the directed graph of neural network layers.

Layers 304 and 312 can be any of a variety of types of neural network layers, e.g., conventional layers like fully-connected layers, convolutional layers, recurrent layers, or attention layers, or other pre-normalized layers.

The layer 308 is configured to perform operations on inputs received from the neural network layer A 304, i.e., layer A outputs 306, to generate a regularization normalization layer output 310 and to provide the layer output 310 as input to the neural network layer B 312.

The operations performed by a regularization normalization layer 308 depend on whether the layer is a fully-connected layer or a convolutional layer, but, generally, the regularization normalization layer 308 performs normalization during the processing of an input by the layer. In particular the pre-normalized layer 308 performs the normalization by explicitly "scaling" the elements of the transformed layer input that is the output of the affine operation. Additionally, the parameters of the affine operation are regularized during the training of the neural network so that the output of the affine transformation are implicitly "scaled."

Training the neural network to cause this implicit shifting is described in more detail below.

More specifically, the layer 308 receives a layer input, e.g., the layer A outputs 306 or the combination of outputs from layer A and another layer, that includes multiple elements, where each element is a distinct "position" within the layer input, e.g., each entry in a vector or each position within an H×W×C feature map.

The layer 308 applies an affine operation to the layer input in accordance with a set of weights of the normalized layer to generate a transformed layer input having a plurality of transformed elements. The weights of the affine operation are part of the parameters of the layer 308 and are learned during the training of the neural network.

When the regularization normalization layer 308 is a fully-connected layer, the affine operation is a multiplication between a matrix of the weights of the regularization normalization layer 308 and the layer input.

When the regularization normalization layer 308 is a convolutional layer, the affine operation is a convolution between a kernel of the weights of the regularization normalization layer 308 and the layer input.

The layer 308 computes a standard deviation of the transformed elements. In some implementations, the standard deviation is equal to the square root of the variance of the transformed elements. In some other implementations, the standard deviation is a numerically stable standard deviation that is equal to $(\sigma_B^2+\varepsilon)^{1/2}$, where $\varepsilon$ is a constant value and $\sigma_B^2$ is the variance of the transformed elements.

The layer 308 generates a scaled layer input that includes a plurality of scaled transformed elements by dividing each transformed element by the standard deviation and generates the layer output 310 from the scaled layer input.

Thus, the layer 308 "scales" the output of the affine operation but does not explicitly "shift" the output (or the layer input).

In some cases, the scaled layer input is the layer output 310.

In some other cases, the layer 308 also applies a scaling parameter to the scaled layer input to generate a second scaled layer input and applies a bias parameter to the second scaled layer input to generate a biased scaled layer input. Then, the layer 308 either uses the biased scaled layer input as the layer output 310 or applies a non-linear activation function to the biased scaled layer input to generate the layer output 310.

The regularization normalization layer 308 may be included at various locations in the directed graph of neural network layers and, in some implementations, multiple pre-normalized layers may be included in the sequence. For example, while the regularization normalization layer 308 is shown as a "hidden" layer of the neural network that receives the output of layer 304, the neural network could also or instead include a pre regularization normalization layer as an input layer that directly processes the network input 302. As one example, an existing neural network architecture can be modified to replace each batch normalized layer with a regularization normalization layer. As another example, a layer normalization layer and a subsequent layer that applies an affine operation can be fused and replaced with a single regularization normalization layer layer.

Prior to using the neural network to process new inputs, the neural network system 300 trains the neural network to determine trained values of the parameters of the neural network, including the parameters of the regularization normalization layer 308.

In particular, the system 300 trains the neural network on training data that includes multiple batches of training examples. A batch of training examples is a set of multiple training examples that each include a training network input and a target output for the training input that represents an output that should be generated by the neural network by performing the neural network task that the neural network is configured for on the training network input.

For example, at each iteration during training, the neural network system 300 can process a batch of training examples and generate a respective neural network output for each training input in the batch. The neural network outputs can then be used to adjust the values of the parameters of the neural network layers, e.g., by computing, through conventional gradient descent and backpropagation neural network training techniques, gradients with respect to the parameters of a loss function that includes one or more terms that make up a task loss function for the neural network task, e.g., a cross-entropy loss, a negative log-likelihood loss, a mean squared error loss, and so on, that is based on the neural network outputs and the target outputs in the training example. Additionally, the loss function includes a regularization term for the regularization normalization layer 308 that causes the "implicit" scaling that is described above.

This training is described in more detail below with reference to FIG. 4.

Thus, the parameters of the pre-normalized layer 308 are learned through gradient descent and backpropagation during the training of the neural network.

Figure 4:
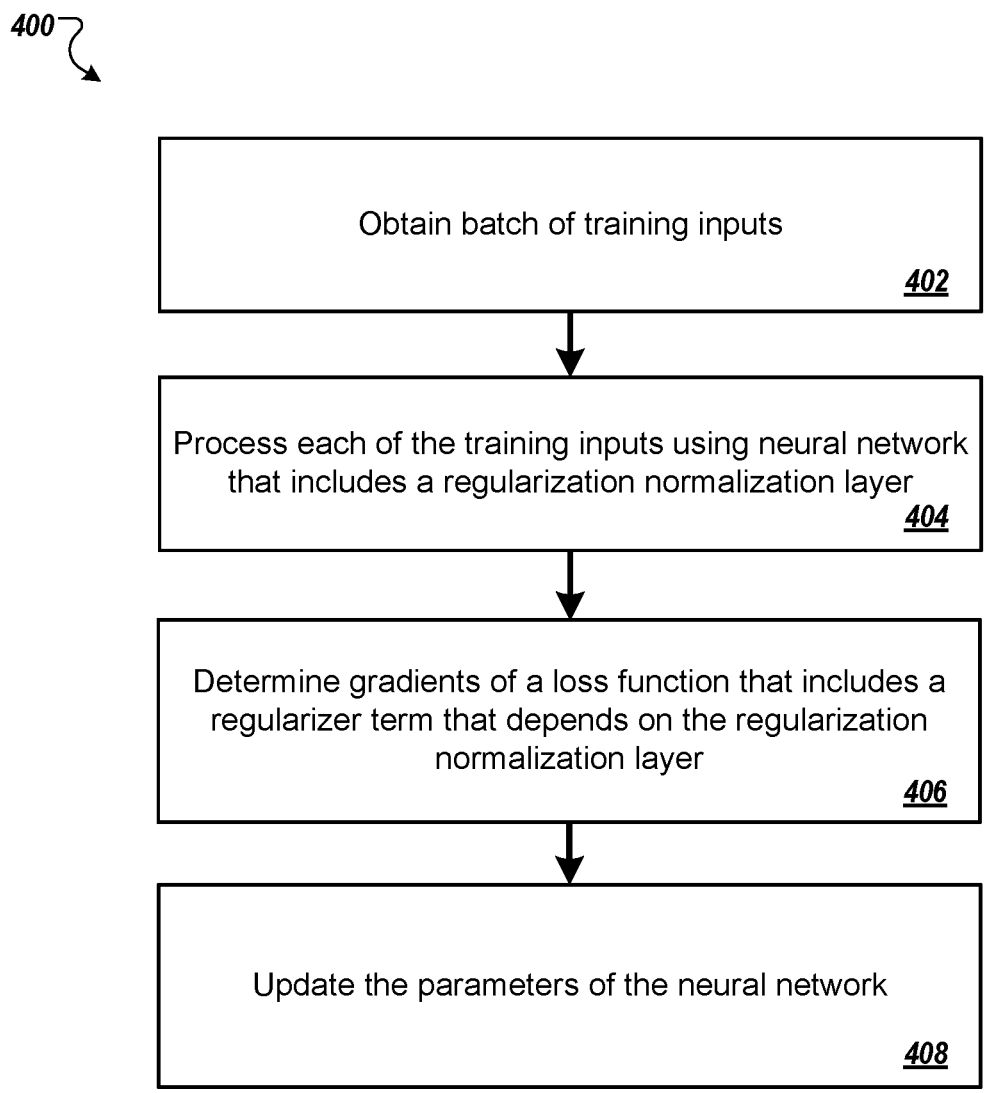
FIG. 4 is a flow diagram of an example process for training a neural network that includes a regularization normalization layer.

FIG. 4 is a flow diagram of an example process 400 for training a neural network that includes a regularization normalization layer. For convenience, the process 400 will be described as being performed by a system of one or more computers located in one or more locations. For example, a neural network system, e.g., the neural network system 300 of FIG. 3, appropriately programmed, can perform the process 400.

The system can repeatedly perform the process 400 on different batches of training inputs selected from a set of training data to train the neural network by repeatedly updating the values of the parameters of the neural network.

The description of the process 400 describes the operation of the training when the neural network has a single regularization normalization layer. When the neural network has multiple regularization normalization layers, the loss function will include a separate term for each of the regularization normalization layers.

The system obtains a batch of one or more training inputs (step 402), e.g., by sampling the batch from a set of training data.

The system processes each of the training inputs in the batch using the neural network and in accordance with current values of the network parameters to generate a respective training output for each training input (step 404). As part of the processing, the system generates a respective scaled layer input for each training input by performing the operations of the regularization normalization layer described above.

The system determines a gradient with respect to a set of parameters of the neural network of a loss function that includes (i) one or more terms that measure a quality of the training outputs with respect to the neural network task and (ii) a regularizer term that penalizes the neural network for a sum of values of the same scaled transformed elements in different scaled layer inputs having a large magnitude (step 406).

The loss function can be, e.g., equal to a sum or weighted sum of (i) and (ii).

The one or more terms that measure the quality of the training outputs with respect to the neural network task can be any appropriate task loss function that is appropriate for the task, e.g., a cross-entropy loss for classification tasks, a negative log likelihood or mean squared error loss for regression tasks, and so on.

By penalizing the neural network for a sum of values of the same scaled transformed elements in different scaled layer inputs having a large magnitude, the regularizer term encourages the neural network to generate layer inputs that include elements that have a mean of zero across the batch.

As a particular example, the regularization loss can be based on, for each of one or more pairs of scaled layer inputs computed during the processing of different training inputs in the batch and for each scaled transformed element: a square of the sum of the value of the scaled transformed element in the first scaled layer input in the pair and the value of the scaled transformed element in the second scaled layer input in the pair.

More specifically, the loss function can measure an expectation of, for a sampled pair of scaled layer inputs, a sum of respective differences for each scaled transformed element. The respective difference for a scaled transformed element is the difference between (i) a square of the sum of the value of the scaled transformed element in the first scaled layer input in the sampled pair and the value of the scaled transformed element in the second scaled layer input in the sampled pair and (ii) 2.

In other words, the regularization term can satisfy:

$$\mathbb{E}_{a,b}[\Sigma_i(\bar{z}_i^b)^2 - 2)],$$

where $\mathbb{E}$ is the expectation operator, a and b are a sampled pair of scaled layer inputs, the sum is over elements I in the scaled layer inputs, $\bar{z}_i^a$ is the value of the scaled transformed element i in the scaled layer input a, and $\bar{z}_i^b$ is the value of the scaled transformed element i in the scaled layer input b.

In practice, during training, the system can either (i) compute the gradient of the regularization term for each possible pair of a and b within the batch or (ii) randomly sample a fixed number of pairs and compute the gradient of the loss for each pair.

The system then updates the parameters of the neural network based on the gradient (step 408). In particular, the system applies an optimizer, e.g., the stochastic gradient descent optimizer, the Adam optimizer, the rmsProp optimizer, a learned optimizer, and so on, to the gradient to determine an update and then applies the update to the current values of the network parameters, i.e., adds the update to or subtracts the update from the current values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices;

magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement:
   a neural network that is configured to receive a network input and to process the neural network input through a plurality of neural network layers to generate a network output, the plurality of neural network layers comprising a pre-normalized layer that is configured to, during processing of the network input by the neural network, perform operations comprising:
      receiving a layer input comprising a plurality of first elements; and
      generating a layer output from the layer input, comprising:
         computing a mean of the plurality of first elements in the layer input;
         generating a shifted layer input by subtracting, from each first element in the layer input, the mean of the plurality of first elements;
         applying an affine operation to the shifted layer input in accordance with a set of weights of the pre-normalized layer to generate a transformed layer input having a plurality of transformed elements;
         computing a standard deviation of the transformed elements; and
         generating a scaled layer input by dividing each transformed element by the standard deviation.

2. The system of claim 1, wherein the pre-normalized layer is a fully-connected layer and the affine operation is a multiplication between a matrix of the weights of the pre-normalized layer and the shifted layer input.

3. The system of claim 1, wherein the pre-normalized layer is a convolutional layer and the affine operation is a convolution between a kernel of the weights of the pre-normalized layer and the shifted layer input.

4. The system of claim 1, the operations further comprising:
provinding the layer output as input to another one of the plurality of neural network layers.

5. The system of claim 1, wherein the layer input is the network input.

6. The system of claim 1, wherein the layer input is an output generated by one or more other layers in the plurality of neural network layers.

7. The system of claim 1, wherein the network input is processed during training of the neural network to determine trained values for at least the set of weights of the pre-normalized layer.

8. The system of claim 1, wherein generating the layer output further comprises:
applying a scaling parameter to the scaled layer input to generate a second scaled layer input; and
applying a bias parameter to the second scaled layer input to generate a biased scaled layer input.

9. The system of claim 8, wherein generating the layer output further comprises:
applying a non-linear activation function to the biased scaled layer input to generate the layer output.

10. The system of claim 8, wherein the scaling parameter and the bias parameter are learned jointly with the set of weights of the pre-normalized layer during training of the neural network.

11. A method performed by one or more computers, the method comprising:
receiving a network input; and
processing the network input using a neural network to generate a network output for the network input, wherein the neural network is configured to process the network input through a plurality of neural network layers to generate the network output, the plurality of neural network layers comprising a pre-normalized layer that is configured to, during processing of the network input by the neural network, perform operations comprising:
receiving a layer input comprising a plurality of first elements; and
generating a layer output from the layer input, comprising:
computing a mean of the plurality of first elements in the layer input;
generating a shifted layer input by subtracting, from each first element in the layer input, the mean of the plurality of first elements;
applying an affine operation to the shifted layer input in accordance with a set of weights of the pre-normalized layer to generate a transformed layer input having a plurality of transformed elements;
computing a standard deviation of the transformed elements; and
generating a scaled layer input by dividing each transformed element by the standard deviation.

12. A method of training a neural network that is configured to receive a network input and to process the neural network input through a plurality of neural network layers to generate a network output for a neural network task,
the plurality of neural network layers comprising a normalized layer that is configured to, during processing of the network input by the neural network, perform operations comprising:
receiving a layer input;
applying an affine operation to the layer input in accordance with a set of weights of the normalized layer to generate a transformed layer input having a plurality of transformed elements;
computing a standard deviation of the transformed elements;
generating a scaled layer input that comprises a plurality of scaled transformed elements by dividing each transformed element by the standard deviation; and
generating a layer output from the scaled layer input, and
the method comprising repeatedly performing the following:
obtaining a batch of training inputs;
processing each of the training inputs in the batch using the neural network to generate a respective training output for each training input, comprising generating a respective scaled layer input for each training input;
determining a gradient with respect to a set of parameters of the neural network of a loss function that includes (i) one or more terms that measure a quality of the training outputs with respect to the neural network task and (ii) a regularizer term that penalizes the neural network for a sum of values of the same scaled transformed elements in different scaled layer inputs having a large magnitude; and
updating the parameters of the neural network based on the gradient.

13. The method of claim 12, wherein the normalized layer is a fully-connected layer and the affine operation is a multiplication between a matrix of the weights of the pre-normalized layer and the layer input.

14. The method of claim 12, wherein the normalized layer is a convolutional layer and the affine operation is a convolution between a kernel of the weights of the pre-normalized layer and the layer input.

15. The method of claim 12, the operations further comprising:
providing the layer output as input to another one of the plurality of neural network layers.

16. The method of claim 12, wherein the layer input is the network input.

17. The method of claim 12 wherein the layer input is an output generated by one or more other layers in the plurality of neural network layers.

18. The method of claim 12, wherein generating the layer output further comprises:
applying a scaling parameter to the scaled layer input to generate a second scaled layer input; and
applying a bias parameter to the second scaled layer input to generate a biased scaled layer input.

19. The method of claim 18, wherein generating the layer output further comprises:
applying a non-linear activation function to the biased scaled layer input to generate the layer output.

20. The method of claim 13, wherein the loss function is based on, for each of one or more pairs of scaled layer inputs computed during the processing of different training inputs in the batch and for each scaled transformed element:
a square of the sum of the value of the scaled transformed element in the first scaled layer input in the pair and the value of the scaled transformed element in the second scaled layer input in the pair.

21. The method of claim 20, wherein the loss function measures an expectation of, for a sampled pair of scaled layer inputs, a sum of respective differences for each scaled transformed element, each respective difference being a difference between (i) a square of the sum of the value of the scaled transformed element in the first scaled layer input in the sampled pair and the value of the scaled transformed element in the second scaled layer input in the sampled pair and (ii) 2.

* * * * *